Feb. 22, 1949.    F. TURRETTINI    2,462,573
PRECISION MACHINE TOOL

Filed Oct. 22, 1947    3 Sheets-Sheet 1

Inventor
Fernand Turrettini
By Robert E. Burns
Attorney

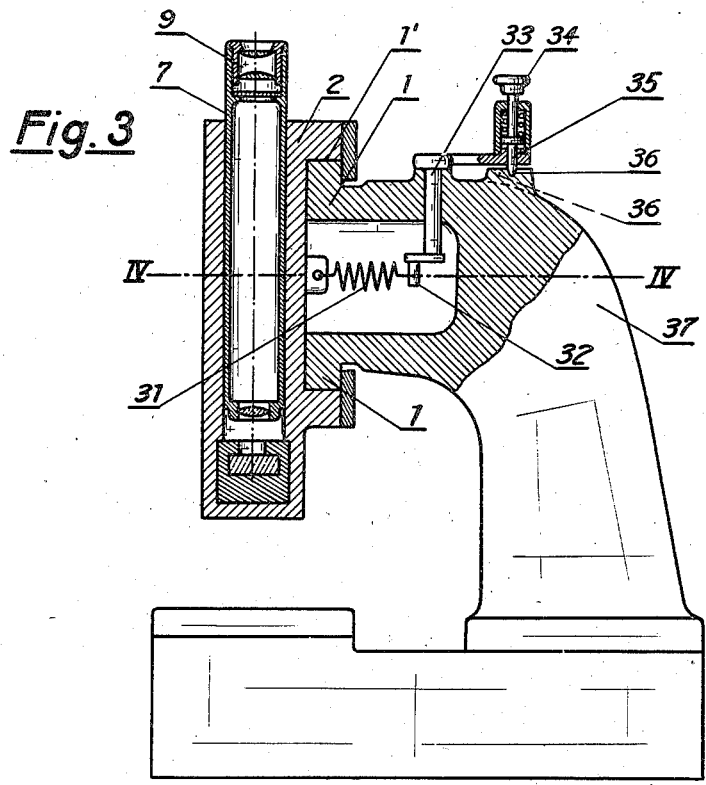
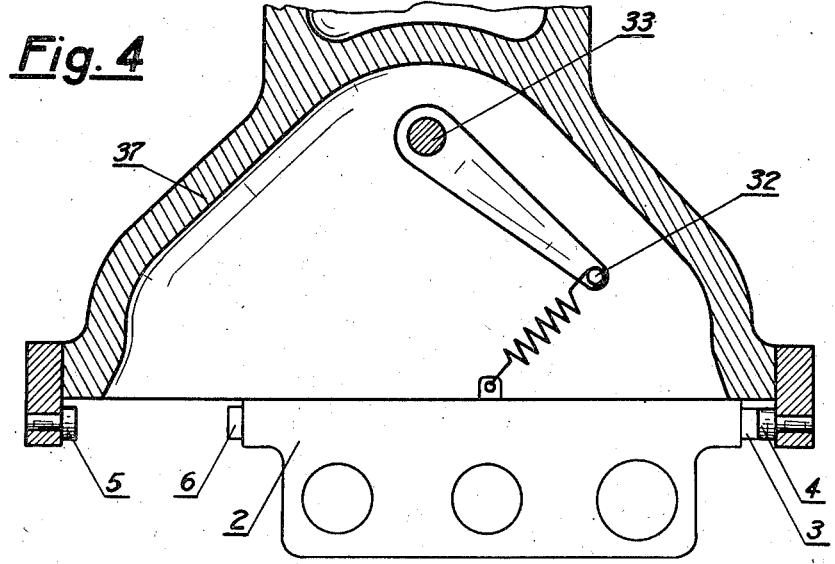

Patented Feb. 22, 1949

2,462,573

UNITED STATES PATENT OFFICE 2,462,573

PRECISION MACHINE TOOL

Fernand Turrettini, Bellevue-Geneva, Switzerland, assignor to Societe Genevoise D'Instruments de Physique, Geneva, Switzerland, a firm of Switzerland Application October 22, 1947, Serial No. 781,457
In Switzerland November 24, 1944

Section 1, Public Law 690, August 8, 1946
Patent expires November 24, 1964

3 Claims. (Cl. 77—5)

The present invention concerns a precision machine-tool. This machine is characterized in that it comprises a slide carrying a microscope, a marking tool and a boring tool, this slide being apt to occupy two stop positions, one of these positions being used for the microscope and one of the tools, this microscope and this tool being retractile to make room reciprocally for one another, whereas the other tool is used in the second stop position, the whole in order that the microscope and both tools can be used successively at the same point.

The microscope can be formed in two parts, one of them being fixed and the other movable, the latter being moved when passing from the working position to the retracted position.

This machine can be further improved by providing that the movable part of the microscope is controlled by a spring tending to keep it in working position, this part presenting an inclined plane against which abuts the marking tool on its way towards its working position, whereby said movable part is moved aside.

The attached drawing shows partially and by way of example two embodiments of the invention, intended more specially for watch-making.

Fig. 3 is a cross-section through III—III of Fig. 1.

Fig. 4 is a cross-section on a larger scale through IV—IV of Fig. 3.

Figure 1:
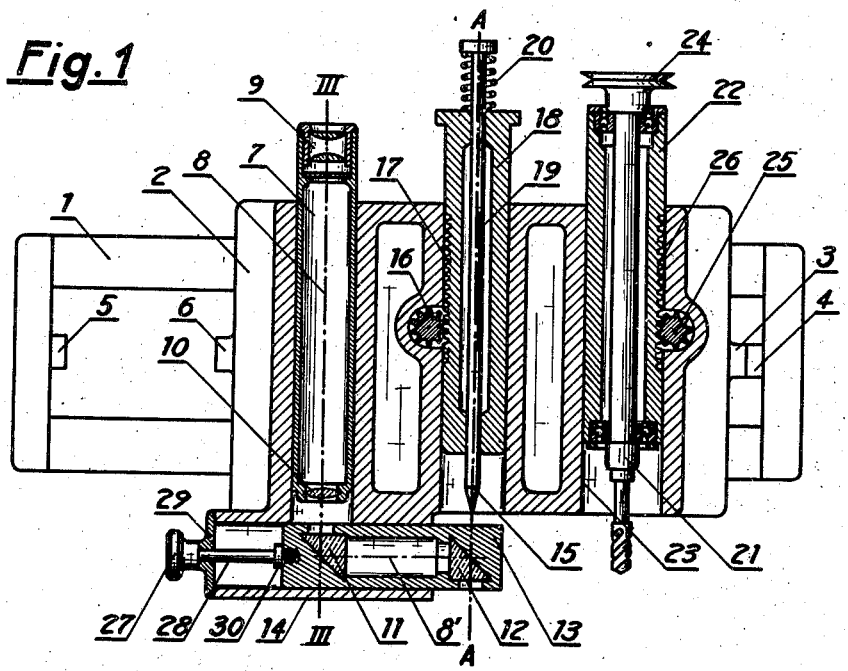
Figs. 1 and 2 are vertical sections through the tool-holder slide of the first embodiment, showing certain parts in two different operating positions.

In the first embodiment shown, the tool-holder slide 2 can move on a prismatic guideway 1, its run being determined by the contacts of the abutments 3 and 4 or 5 and 6. The work axis is the axis A—A in Fig. 1 which shows the microscope in working position. The microscope 7 has its optical axis at 8. On the optical axis, there are an ocular 9, an objective 10, and prisms (or mirrors) 11 and 12 breaking the optical axis a first time to give it the direction 8' and a second time for giving it the direction A—A.

Figure 2:
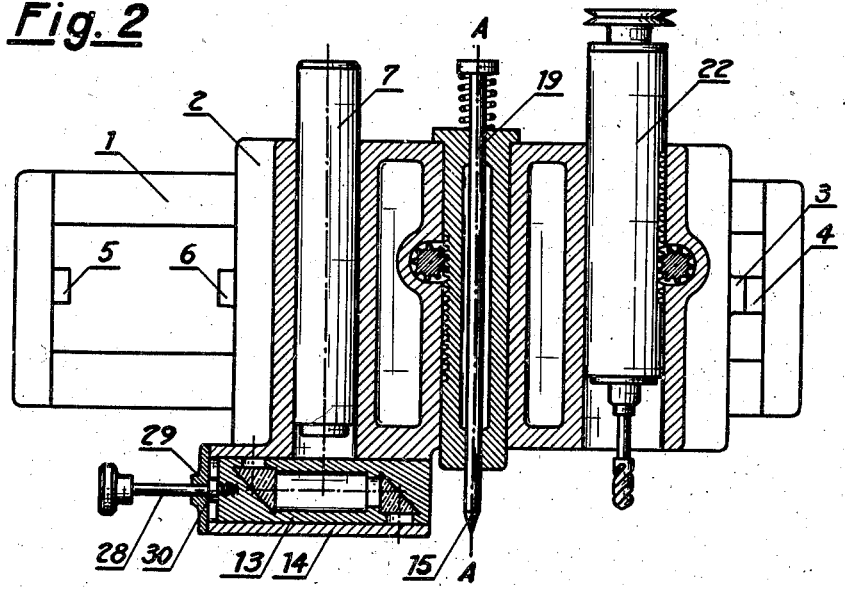

The prisms 11 and 12 are assembled in a movable slide 13 apt to move at right angle to the optical axis 8 and which can occupy two positions; one of these positions is shown in Fig. 1, and the other is shown in Fig. 2, in which the slide 13 is set back in its sheath 14. The position of use of the prism carrying slide 13 is determined by the contact of a knob 27 secured on a rod 28 screwed in the slide 13. This contact is made against the wall 29 forming the bottom of said sheath. The set-back position of the prism carrying slide is determined by the contact of the flange 30 against the same bottom wall 29.

The axis of the marking tool 15 coincides with the axis A—A, when this tool is in working position; in Fig. 1, this tool is shown in its raised position, when it has been lifted, by means of a pinion 16 meshing with a rack 17 forming part of the guiding sleeve 18 of the marking tool, in order to allow the prism carrying slide 13 to be brought forward. The central rod 19 of the marking tool passes through the whole length of the guiding sleeve 18 and is sustained by a coil spring 20. A boring tool 21, revolvable in a quill 22, can slide axially with the latter in a bore 23 which is parallel to the bore containing the marking tool guiding sleeve. This boring tool can be driven by any means, as for example by a pulley 24 located at the top of the boring tool, and the feed movement of this tool is given by a pinion 25 meshing with a rack 26 forming part of the quill 22 of the boring tool.

When the slide is in the position shown in Figs. 1 and 2, the operator can either mark a work piece with the marking tool, or else effectuate a measurement with the microscope. In order to carry out one or the other of these operations, he must act either on the prism carrying slide 13, or else on the pinion 16 provided for lowering the marking tool. If he wants to use the boring tool, he will move the slide 2 to the left until the contact of the abutments 5 and 6 defines its second position. At this moment, the quill is exactly in the position which the marking tool occupied previously, since the free run of the slide 2 from the contact of the abutment 4 to the contact of the abutment 5 is equal to the distance separating the axis of the marking tool 15 from the axis of the boring tool 21. The operator is thus able to use at the same point three different tools, although operating in two positions of the tool-holder slide only.

As regards the precision of operation of the apparatus, the main thing is to have absolutely flat bearing surfaces in the guideway 1; then a perfect contact between the abutments 3—4 and 5—6 is also of importance. In order to avoid any play in the movement of the slide 2 against the guideway 1, it is desirable that the slide be always solicited in a backward direction, which condition can be fulfilled by providing a spring 31 attached on the one hand to the slide 2 and on the other hand to a crank 32. This crank is rigid with a shaft 33 which can be rotated by means of a handle 34. This handle is provided with a stop finger 35 arranged to be apt to engage either the recesses 36 and 36' provided in the support 37 of the guideway 1.

The oblique pull of the spring 31, as shown in Figs. 3 and 4, ensures on the one hand the perfect contact of the slide 2 on the front face of the guideway 1, and on the other hand the contact of the abutments 5 and 6 or 3 and 4, according to the position of the stop-finger 35.

Figure 5:
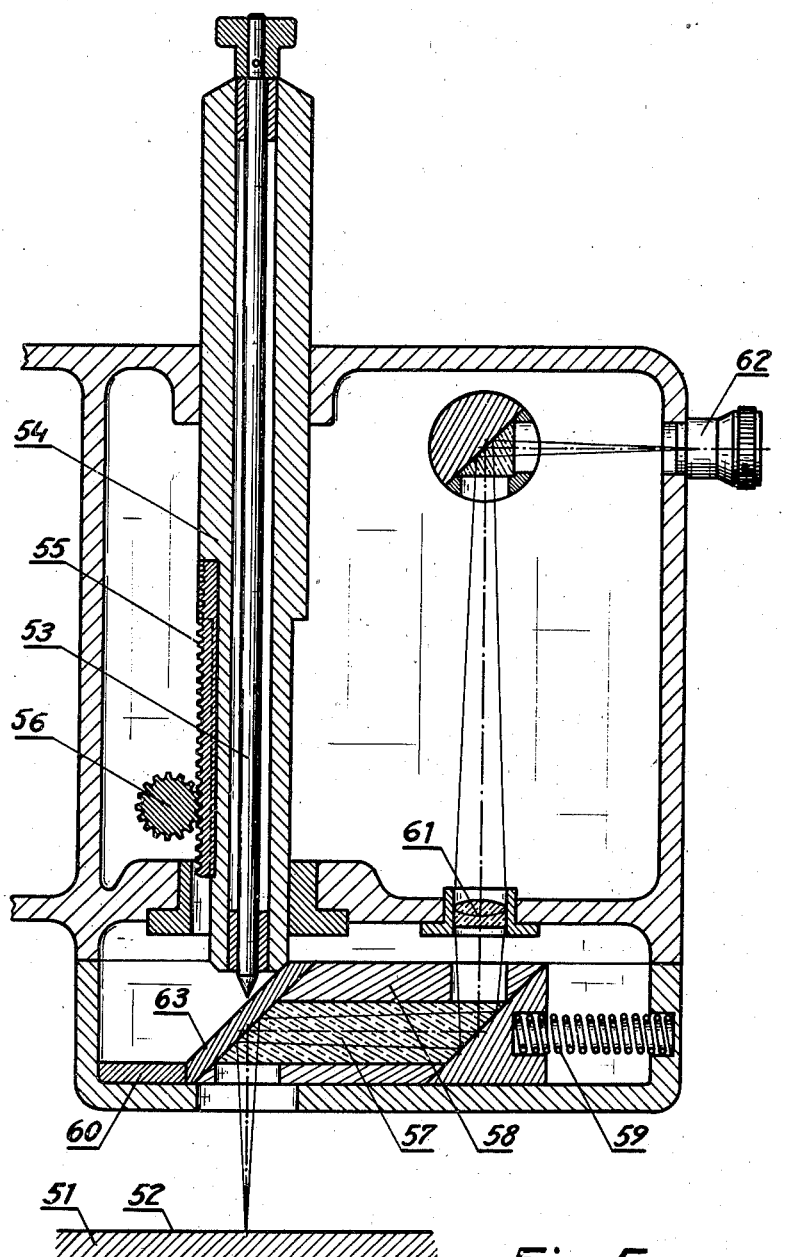
Fig. 5 is a cross-section of the second embodiment, showing the microscope in working position, whilst the marking tool is in rest position.

In the second embodiment shown partially in Fig. 5, the work piece is at 51, and the surface which is to be observed with the microscope is at 52. The marking tool 53 is mounted in a sliding sleeve 54, on which is secured a rack 55. A pinion 56, controlling the vertical sliding movement of the tool, is manually operable, as by a hand-wheel (not shown).

The microscope comprises a double prism 57 mounted in a carriage 58 apt to slide horizontally. The carriage 58 is pushed to the left by a coil spring 59, and an abutment 60 stops this carriage in a determined position for the observation of the ocular 62 through the objective 61. The left end of the carriage 58 presents an inclined plane 63 which can come in contact with the sleeve 54 of the tool. When the tool is being lowered for bringing it into working position, the sleeve 54 pushes the carriage 58 to the right; if the tool is brought back to its rest position, it is the spring 59 which gives the carriage 58 its movement to the left. The operation of the pinion 56 has therefore the effect of enabling to use the marking tool 53 or to observe with the microscope, without any further operation.

What I claim is:

1. In a precision boring machine in combination a frame, a work table on said frame, a horizontal guideway supported above said work table on said frame, a tool-holder slide shiftable on said guideway between two fixed abutments, means for arresting said slide against said abutments, a microscope on said slide, a first guiding sleeve vertically shiftable in said slide, a marking tool axially slidable in said first guiding sleeve, a second guiding sleeve vertically shiftable in said slide in spaced relation to said first sleeve, a boring tool rotatably mounted in said second guiding sleeve, said first and second guiding sleeves being at a spacing from one another equal to the run of said slide on said guideway, and a prism assembly forming a part of said microscope shiftable parallelly to said guideway on said slide between a working position in which the optical axis of said microscope is brought in coincidence with the axis of said marking tool and a rest position away from said tool, whereby both said marking tool and boring tool can be lowered in succession onto the same point of the working piece which has been determined by the microscope.

2. In a precision boring machine, the combination as claimed in claim 1, wherein spring means is provided for simultaneously applying the slide against the guideway and against either of the abutments.

3. In a precision boring machine, the combination as claimed in claim 1 wherein the prism assembly is provided with an inclined end surface in contact with the first vertically shiftable sleeve and contacts by its other end with a compression spring bearing on the slide whereby said prism assembly is automatically shifted aside from working position into rest position when said first sleeve is brought down from rest position to working position, and reciprocally.

FERNAND TURRETTINI.

REFERENCES CITED

The following references are of record in the file of this patent:

UNITED STATES PATENTS

| Number | Name | Date |
|---|---|---|
| 390,108 | Whitney | Sept. 25, 1888 |
| 576,988 | Woodward | Feb. 9, 1897 |

FOREIGN PATENTS

| Number | Country | Date |
|---|---|---|
| 426,257 | Great Britain | Mar. 29, 1935 |